(12) United States Patent
Bank

(10) Patent No.: US 10,116,717 B2
(45) Date of Patent: *Oct. 30, 2018

(54) PLAYLIST COMPILATION SYSTEM AND METHOD

(71) Applicant: Intel Corporation, Santa Clara, CA (US)

(72) Inventor: Bryna L. Bank, San Francisco, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/727,256

(22) Filed: Oct. 6, 2017

(65) Prior Publication Data

US 2018/0063211 A1 Mar. 1, 2018

Related U.S. Application Data

(63) Continuation of application No. 15/234,902, filed on Aug. 11, 2016, now Pat. No. 9,813,473, which is a
(Continued)

(51) Int. Cl.
*H04L 29/06* (2006.01)
*G06F 17/30* (2006.01)
(Continued)

(52) U.S. Cl.
CPC ........ *H04L 65/60* (2013.01); *G06F 17/30038* (2013.01); *G06F 17/30053* (2013.01); *G06F 17/30772* (2013.01); *H04L 67/02* (2013.01); *H04L 67/06* (2013.01); *H05K 999/99* (2013.01); *G06F 3/0482* (2013.01); *G06F 3/04817* (2013.01)

(58) Field of Classification Search
CPC ................................ H04L 67/02; H04L 67/06
See application file for complete search history.

(56) References Cited

U.S. PATENT DOCUMENTS 5,440,334 A 8/1995 Walters
5,481,610 A 1/1996 Doiron
(Continued)

FOREIGN PATENT DOCUMENTS

GB 2405718 3/2005
JP H088851 A 1/1996
(Continued)

OTHER PUBLICATIONS

US 8,700,534, 04/2014, Hug (withdrawn)
(Continued)

*Primary Examiner* — Adnan Mirza
(74) *Attorney, Agent, or Firm* — Christopher K. Gagne

(57) ABSTRACT

A method, computer program product and client electronic device for storing, in a memory of a client electronic device, a location of at least one remote media data file available to stream from a server device. A location of at least one local media data file available on the client electronic device is stored in the memory of the client electronic device. A playlist is compiled that defines the location of the at least one remote media data file and the location of the at least one local media data file. The at least one local media data file and the at least one remote media data file in the playlist are rendered and metadata concerning the at least one local media data file rendered is transmitted to the server device.

38 Claims, 9 Drawing Sheets

Related U.S. Application Data continuation of application No. 14/535,938, filed on Nov. 7, 2014, now Pat. No. 9,444,864, which is a continuation of application No. 13/970,022, filed on Aug. 19, 2013, now Pat. No. 8,909,741, which is a continuation of application No. 11/112,441, filed on Apr. 22, 2005, now Pat. No. 8,516,093.

(51) Int. Cl.
*H04L 29/08* (2006.01)
*G06F 3/0481* (2013.01)
*G06F 3/0482* (2013.01)

(56) References Cited

U.S. PATENT DOCUMENTS

| | | |
|---|---|---|
| 5,586,264 A | 12/1996 | Belknap |
| 5,608,171 A | 3/1997 | Hunter |
| 5,629,980 A | 5/1997 | Stefik |
| 5,655,144 A | 8/1997 | Milne |
| 5,708,422 A | 1/1998 | Blonder |
| 5,708,709 A | 1/1998 | Rose |
| 5,745,902 A | 4/1998 | Miller |
| 5,819,160 A | 10/1998 | Foladare |
| 5,857,020 A | 1/1999 | Peterson |
| 5,892,900 A | 4/1999 | Ginter |
| 6,009,401 A | 12/1999 | Horstmann |
| 6,151,634 A | 11/2000 | Glaser |
| 6,189,146 B1 | 2/2001 | Misra |
| 6,219,652 B1 | 4/2001 | Carter |
| 6,226,618 B1 | 5/2001 | Downs |
| 6,236,971 B1 | 5/2001 | Stefik |
| 6,373,948 B1 | 4/2002 | Wool |
| 6,434,621 B1 | 8/2002 | Pezzillio |
| 6,484,182 B1 | 11/2002 | Dunphy |
| 6,560,651 B2 | 5/2003 | Katz |
| 6,597,961 B1 | 7/2003 | Cooke |
| 6,662,231 B1 | 12/2003 | Drosset |
| 6,842,906 B1 | 1/2005 | Bowman-Amuah |
| 6,853,728 B1 | 2/2005 | Kahn |
| 6,920,567 B1 | 7/2005 | Doherty |
| 6,961,858 B2 | 11/2005 | Fransdonk |
| 6,987,221 B2 | 1/2006 | Platt |
| 7,010,689 B1 | 3/2006 | Matyas |
| 7,020,635 B2 | 3/2006 | Hamilton |
| 7,043,477 B2 | 5/2006 | Mercer |
| 7,069,347 B1 | 6/2006 | Kolokowsky |
| 7,073,063 B2 | 7/2006 | Peinado |
| 7,080,049 B2 | 7/2006 | Truitt |
| 7,089,309 B2 | 8/2006 | Ramaley |
| 7,090,128 B2 | 8/2006 | Farley |
| 7,107,462 B2 | 9/2006 | Fransdonk |
| 7,150,045 B2 | 12/2006 | Koelle |
| 7,203,966 B2 | 4/2007 | Abburi |
| 7,272,859 B2 | 9/2007 | Kuriya |
| 7,318,236 B2 | 1/2008 | DeMello |
| 7,328,243 B2 | 2/2008 | Yeager |
| 7,395,244 B1 | 7/2008 | Kingsford |
| 7,406,436 B1 | 7/2008 | Reisman |
| 7,480,691 B2 | 1/2009 | Okumura |
| 7,523,071 B2 | 4/2009 | Fox |
| 7,587,502 B2 | 9/2009 | Crawford |
| 7,685,646 B1 | 3/2010 | Hug |
| 7,711,586 B2 | 5/2010 | Aggarwal |
| 7,840,691 B1 | 11/2010 | Debonet |
| 7,882,034 B2 | 2/2011 | Hug |
| 7,987,491 B2 | 7/2011 | Reisman |
| 8,185,475 B2 | 5/2012 | Hug |
| 8,498,942 B2 | 7/2013 | Hug |
| 8,516,093 B2 | 8/2013 | Bank |
| 8,738,537 B2 | 5/2014 | Hug |
| 8,909,741 B2 | 12/2014 | Bank |
| 9,444,864 B2 | 9/2016 | Bank |
| 9,794,315 B2 | 10/2017 | Bank |
| 9,813,473 B2 | 11/2017 | Bank |
| 9,864,850 B2 | 1/2018 | Hug |
| 2001/0025256 A1 | 9/2001 | Oliphant |
| 2001/0039614 A1 | 11/2001 | Hellberg |
| 2001/0044851 A1 | 11/2001 | Rothman |
| 2002/0002039 A1 | 1/2002 | Qureshey |
| 2002/0012443 A1 | 1/2002 | Rhoads |
| 2002/0013784 A1 | 1/2002 | Swanson |
| 2002/0023010 A1 | 2/2002 | Rittmaster |
| 2002/0049717 A1 | 4/2002 | Routtenberg |
| 2002/0108049 A1 | 8/2002 | Xu |
| 2002/0157034 A1 | 10/2002 | Sagar |
| 2002/0188746 A1 | 12/2002 | Drosset |
| 2002/0198846 A1 | 12/2002 | Lao |
| 2003/0018582 A1 | 1/2003 | Yaacovi |
| 2003/0028395 A1 | 2/2003 | Rodgers |
| 2003/0097655 A1 | 5/2003 | Novak |
| 2003/0115069 A1 | 6/2003 | Pence |
| 2003/0163684 A1 | 8/2003 | Fransdonk |
| 2003/0167318 A1 | 9/2003 | Robbin |
| 2003/0182315 A1 | 9/2003 | Plastina |
| 2003/0189879 A1 | 10/2003 | Ishii |
| 2003/0236905 A1 | 12/2003 | Choi |
| 2004/0003270 A1 | 1/2004 | Bourne |
| 2004/0078383 A1 | 4/2004 | Mercer |
| 2004/0116088 A1 | 6/2004 | Ellis |
| 2004/0139312 A1 | 7/2004 | Medvinsky |
| 2004/0181490 A1 | 9/2004 | Gordon |
| 2004/0220881 A1 | 11/2004 | Powell |
| 2004/0260716 A1 | 12/2004 | Sugiura |
| 2005/0010531 A1 | 1/2005 | Kushalnagar |
| 2005/0022019 A1 | 1/2005 | Medvinsky |
| 2005/0094516 A1 | 5/2005 | Morimoto |
| 2005/0114374 A1 | 5/2005 | Juszkiewicz |
| 2005/0125222 A1 | 6/2005 | Brown |
| 2005/0131731 A1 | 6/2005 | Brydon |
| 2005/0138186 A1 | 6/2005 | Hesselink |
| 2005/0203959 A1 | 9/2005 | Muller |
| 2006/0085349 A1 | 4/2006 | Hug |
| 2006/0085351 A1 | 4/2006 | Hug |
| 2006/0085352 A1 | 4/2006 | Hug |
| 2006/0259436 A1 | 11/2006 | Hug |
| 2006/0265329 A1 | 11/2006 | Hug |
| 2007/0033295 A1 | 2/2007 | Marriott |
| 2007/0130589 A1 | 6/2007 | Davis |
| 2013/0305052 A1 | 11/2013 | Hug |
| 2017/0034236 A1 | 2/2017 | Bank |
| 2017/0063951 A1 | 3/2017 | Bank |

FOREIGN PATENT DOCUMENTS

| | | |
|---|---|---|
| JP | 10-190594 | 7/1998 |
| JP | 2002-325221 | 11/2002 |
| JP | 2004-194271 | 7/2004 |
| JP | 2010-190594 | 9/2010 |
| WO | 03/038704 A1 | 5/2003 |
| WO | 2003058410 | 7/2003 |
| WO | 2005052901 A2 | 6/2005 |
| WO | 2005052901 A3 | 12/2005 |
| WO | 2007041517 A2 | 4/2007 |
| WO | 2007041567 A2 | 4/2007 |
| WO | 2007041609 A2 | 4/2007 |
| WO | 2007078395 A2 | 7/2007 |
| WO | 2007078396 A2 | 7/2007 |
| WO | 2007078397 A2 | 7/2007 |
| WO | 2007041567 A3 | 10/2007 |
| WO | 2007041609 A3 | 10/2007 |
| WO | 2007078396 A3 | 10/2007 |
| WO | 2007078395 A3 | 11/2007 |
| WO | 2007041517 A3 | 12/2008 |
| WO | 2007078397 A3 | 5/2009 |

OTHER PUBLICATIONS

Office Action dated Jun. 9, 2010 in U.S. Appl. No. 11/322,314.
Office Action dated Sep. 2, 2009 in U.S. Appl. No. 11/322,314.
Office Action dated Mar. 16, 2009 in U.S. Appl. No. 11/322,314.
Office Action dated Sep. 15, 2008 in U.S. Appl. No. 11/322,314.
Office Action dated Oct. 24, 2013 in U.S. Appl. No. 11/242,339.

Office Action dated Apr. 13, 2010 in U.S. Appl. No. 11/322,717.
Office Action dated Aug. 3, 2009 in U.S. Appl. No. 11/322,717.
Office Action dated Dec. 1, 2009 in U.S. Appl. No. 11/242,223.
Office Action dated Dec. 6, 2012 in U.S. Appl. No. 11/322,720.
Office Action dated Feb. 9, 2009 in U.S. Appl. No. 10/719,981.
Office Action dated Jan. 23, 2009 in U.S. Appl. No. 11/322,717.
Office Action dated Jun. 13, 2008 in U.S. Appl. No. 10/719,981.
Office Action dated Mar. 4, 2009 in U.S. Appl. No. 11/242,223.
Office Action dated Mar. 15, 2010 in U.S. Appl. No. 10/719,981.
Office Action dated Mar. 29, 2012 in U.S. Appl. No. 11/322,717.
Office Action dated Oct. 26, 2010 in U.S. Appl. No. 11/322,717.
Office Action dated Sep. 27, 2007 in U.S. Appl. No. 10/719,981.
International Preliminary Report on Patentability and Written Opinion dated Apr. 8, 2008 in PCT Application No. PCT/US2006/38708.
International Search Report and Written Opinion dated Aug. 17, 2007 in PCT Application No. PCT/US2006/38708.
Office Action dated Oct. 26, 2009 in U.S. Appl. No. 11/242,339.
Office Action dated Sep. 16, 2008 in U.S. Appl. No. 11/242,339.
Office Action dated Mar. 19, 2009 in U.S. Appl. No. 11/242,341.
Office Action dated Sep. 27, 2010 in U.S. Appl. No. 11/242,341.
Office Action dated Sep. 15, 2009 in U.S. Appl. No. 11/242,341.
Office Action dated Sep. 26, 2008 in U.S. Appl. No. 11/242,341.
Office Action dated Apr. 9, 2014 in U.S. Appl. No. 11/322,720.
Office Action dated Mar. 4, 2009 in U.S. Appl. No. 11/322,720.
Notice of Allowance dated Sep. 6, 2017 in U.S. Appl. No. 14/178,110.
Office Action dated Dec. 28, 2016 in U.S. Appl. No. 14/178,110.
Office Action dated Jun. 5, 2017 in U.S. Appl. No. 14/178,110.
Preliminary Amendment filed Dec. 5, 2017 in U.S. Appl. No. 15/832,098.
Preliminary Amendment filed Dec. 5, 2017 in U.S. Appl. No. 15/832,133.
Preliminary Amendment filed Dec. 5, 2017 in U.S. Appl. No. 15/832,061.
Notice of Allowance dated Jun. 19, 2017 in U.S. Appl. No. 15/352,377.
Notice of Allowance dated Mar. 16, 2017 in U.S. Appl. No. 15/352,377.
Notice of Allowance dated Jul. 12, 2017 in U.S. Appl. No. 15/234,902.
Office Action dated Mar. 24, 2017 in U.S. Appl. No. 15/234,902.
Notice of Allowance dated May 1, 2013 in U.S. Appl. No. 11/112,441, and related attachments.
Office Action dated Apr. 12, 2013 in U.S. Appl. No. 11/112,441, and related attachments.
Office Action dated Jan. 7, 2013 in U.S. Appl. No. 11/112,441, and related attachments.
Office Action dated Jun. 19, 2012 in U.S. Appl. No. 11/112,441, and related attachments.
Office Action dated Aug. 31, 2010 in U.S. Appl. No. 11/112,441, and related attachments.
Office Action dated Mar. 17, 2010 in U.S. Appl. No. 11/112,441, and related attachments.
Office Action dated Jul. 8, 2009 in U.S. Appl. No. 11/112,441, and related attachments.
Office Action dated Jan. 14, 2009 in U.S. Appl. No. 11/112,441, and related attachments.
Office Action dated Aug. 5, 2008 in U.S. Appl. No. 11/112,441, and related attachments.
Notice of Allowance dated Aug. 21, 2014 in U.S. Appl. No. 13/970,022, and related attachments.
Office Action dated Jul. 18, 2014 in U.S. Appl. No. 13/970,022, and related attachments.
Notice of Allowance dated May 20, 2016 in U.S. Appl. No. 14/535,938, and related attachments.
Office Action dated Feb. 9, 2016 in U.S. Appl. No. 14/535,938, and related attachments.
Office Action dated Dec. 3, 2015 in U.S. Appl. No. 14/535,938, and related attachments.
Office Action dated Jun. 5, 2015 in U.S. Appl. No. 14/535,938, and related attachments.
Office Action dated Mar. 24, 2017 in U.S. Appl. No. 15/234,902, and related attachments.
Notice of Allowance dated Mar. 16, 2017 in U.S. Appl. No. 15/352,377, and related attachments.
Office Action dated Mar. 28, 2018 in U.S. Appl. No. 15/727,256, and related attachments.
Notice of Allowance dated Jul. 12, 2017 in U.S. Appl. No. 15/234,902, and related attachments.
Notice of Allowance dated Jun. 19, 2017 in U.S. Appl. No. 15/352,377, and related attachments.
Abrams, Controlling Primary and Secondary Access to Digital Information, The Mitre Corporation, Oct. 16 to 18, 2000.
Belt, Cable 3.0: DRM for Linear Content Delivery, Cable Labs, Dec. 2010.
Breakthrough in Digital Security Spurs PHISH to Offer New Year's Eve Concert Tracks via Internet, Business Wire, Dec. 30, 1999.
Challenge, Render, Chambers 21st Century Dictionary, London: Champers Harrap, 2001, Credo Reference, Jul. 25, 2009.
Subscription, Collins English Dictionary, London, Collins 2000, Credo Reference, Jul. 25, 2009.
DeviceSecurity: 1 Service Template, UPNP Device Architecture 1.0, Standardized DCP, Nov. 17, 2003.
ViaTech Technologies, Inc., retrieved from http://web.archive.org/web/2003118151847/http:1/viatechinc.com, Nov. 18, 2003.
The Napster Dilemma Solved: Free Doesn't Need to Mean Piracy, Viatech Technologies, Inc., Market Wire, Aug. 1, 2000.
White, How Computers Work, Millennium Edition, Que Corporation, 1999.
Menezes, Handbook of Applied Cryptography, Chapter 1, CRC Press, 1997.
Subscription, Collins English Dictionary, London, HarperCollins, 2000.
Render, Challenge, Chambers 21st Century Dictionary, London, Champers Harrap, 2001.
An Introduction to Cryptography, PGP, Version 7.0, Network Associates, Inc., 1990-2000.
Merriam-Webster, Collegiate Dictionary 10th Edition, Springfield Mass., 1993.
Notice of Allowance dated Apr. 11, 2014 in U.S. Appl. No. 11/242,339.
Office Action dated Mar. 28, 2014 in U.S. Appl. No. 11/322,717.
Office Action dated Mar. 28, 2013 in U.S. Appl. No. 11/322,314.
Office Action dated Mar. 13, 2012 in U.S. Appl. No. 11/242,339.
Office Action dated Jun. 10, 2008 in U.S. Appl. No. 11/242,339.
Office Action dated Nov. 28, 2008 in U.S. Appl. No. 11/242,223.
Office Action dated Apr. 15, 2010 in U.S. Appl. No. 11/322,720.
Office Action dated Aug. 26, 2009 in U.S. Appl. No. 11/322,720.
Office Action dated May 22, 2013 in U.S. Appl. No. 11/322,717.
Office Action dated Nov. 19, 2012 in U.S. Appl. No. 13/452,611.
Office Action dated Oct. 19, 2012 in U.S. Appl. No. 13/452,611.
Office Action dated Aug. 2, 2012 in U.S. Appl. No. 11/322,314.
Office Action dated Oct. 27, 2011 in U.S. Appl. No. 11/322,314.
Office Action dated May 11, 2011 in U.S. Appl. No. 11/322,314.

US 10,116,717 B2

PLAYLIST COMPILATION SYSTEM AND METHOD

TECHNICAL FIELD

This disclosure relates to playlists and, more particularly, to playlists that include entries concerning both remote media data files and local media data files.

BACKGROUND

Media distribution systems (e.g., the Rhapsody™ service offered by RealNetworks™ of Seattle, Wash.) distribute media data files to a user's electronic device from a media server. A media distribution system may distribute media data files by allowing a user to receive downloaded media data files and/or stream remote media data files.

Streaming is a technique of transferring data files such that the data file is processed as a steady and continuous stream of information as it is being received. When streaming data files, a client-side browser on a user's electronic device can start processing the data file before the entire data file is transmitted. The streamed media data file may be in the form of audio, text, pictures, and/or video, examples of which include but are not limited to the streaming of music, radio broadcasts, movies, television/cable broadcasts, and sporting events, for example.

Often, when a user streams media data files (examples of which include but are not limited to songs, videos, etc.) from a media server, the media distribution system keeps track of the media data files streamed (or to be streamed) to the user's electronic device in the form of a history file. Users may save this history file (or portions thereof) as a playlist. A playlist may be a group of tracks (examples of which include, but are not limited to, songs, videos, etc) that the media distribution system or media player will render in sequence, thus allowing the user to compile custom music compilations.

DETAILED DESCRIPTION OF THE PREFERRED EMBODIMENTS

Figure 1:
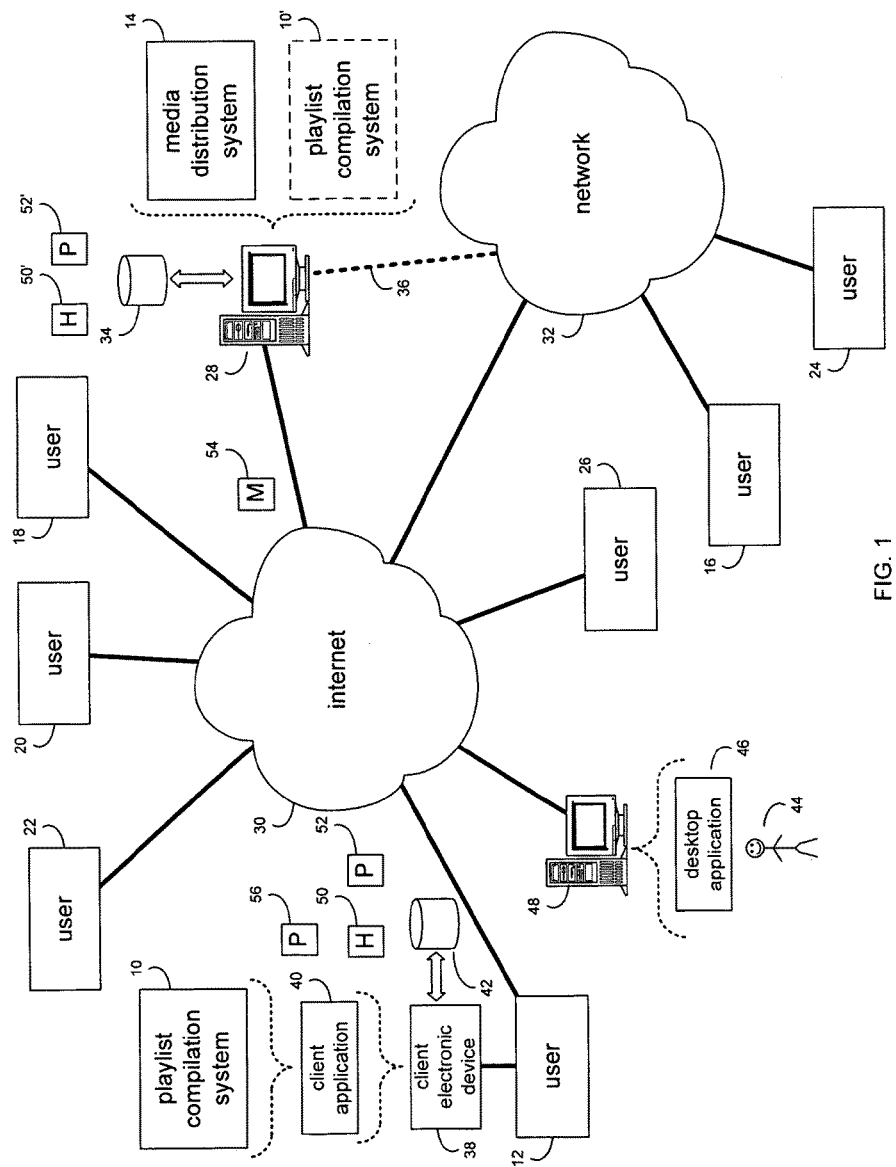
FIG. 1 is a diagrammatic view of a playlist compilation system and a media distribution system coupled to a distributed computing network.

Referring to FIG. 1, there is shown a playlist compilation system 10 that allows a user (e.g., user 12) to compile one or more hybrid playlists that define the location of both remote media data files (examples of which include but are not limited to data streams that are streamed by media distribution system 14) and local media data files (examples of which include but are not limited to data files that are provided by media distribution system 14 or another source). Examples of a remote media stream include: an audio media stream; a video media stream; and an audio/video media stream. Examples of a local media data file include: an audio media data file; a video media data file; and an audio/video media data file.

Media distribution system 14 typically provides media streams and/or media data files to a plurality of users (e.g., users 12, 16, 18, 20, 22, 24, 26). An example of such a media distribution system 14 is the Rhapsody™ service offered by RealNetworks™ of Seattle, Wash.

Media distribution system 14 is typically a server application that resides on and is executed by computer 28 (i.e., a server device) that is connected to network 30 (e.g., the Internet). Computer 28 may be a web server running a network operating system, examples of which include but are not limited to Microsoft Windows 2000 Server™, Novell Netware™, or Redhat Linux™.

Typically, computer 28 also executes a web server application, examples of which include but are not limited to Microsoft I IS™, Novell Webserver™, or Apache Webserver™, that allows for HTTP (i.e., HyperText Transfer Protocol) access to computer 28 via network 30. Network 30 may be connected to one or more secondary networks (e.g., network 32), such as: a local area network; a wide area network; or an intranet, for example.

The instruction sets and subroutines of media distribution system 14, which are typically stored on a storage device 34 coupled to computer 28, are executed by one or more processors (not shown) and one or more memory architectures (not shown) incorporated into computer 28. Storage device 34 may, by way of example, include but are not limited to a hard disk drive, a tape drive, an optical drive, a RAID array, a random access memory (RAM), or a read-only memory (ROM).

Users 12, 16, 18, 20, 22, 24, 26 may access media distribution system 14 directly through network 30 or through secondary network 32. Further, computer 28 (i.e., the computer that executes media distribution system 14) may be connected to network 30 through secondary network 32, as illustrated with phantom link line 36.

Users 12, 16, 18, 20, 22, 24, 26 typically access media distribution system 14 through a client electronic device 38 (examples of which include but are not limited to a client computer, a personal digital assistant, a cellular telephone, a television, a cable box, an internet radio, or a dedicated network device, for example) that is connected to network 30 (or network 32) and executes a client application 40 (examples of which include but are not limited to Microsoft Internet Explorer™, Netscape Navigator™, RealRhapsody™, RealPlayer™, or a specialized interface). Client electronic device 40 may run an operating system, examples of which include but are not limited to Microsoft Windows™, or Redhat Linux™. Additionally, client electronic device 38 may include one or more local data drives (not shown), examples of which include, but are not limited to, a CDROM drive and a DVD drive.

Playlist compilation system 10 is typically a component of client application 40 (examples of which include but are not limited to an embedded feature of client application 40, a software plug-in for client application 40, or a stand-alone application called from within and controlled by client application 40). The instruction sets and subroutines of client application 40 and playlist compilation system 10, which are typically stored on a storage device 42 coupled to client electronic device 38, are executed by one or more processors (not shown) and one or more memory architectures (not shown) incorporated into client electronic device 38. Storage device 42 may be, for example, a hard disk drive, a tape drive, an optical drive, a RAID array, a random access memory (RAM), or a read-only memory (ROM).

An administrator 44 typically accesses and administers media distribution system 14 through a desktop application 46 (examples of which include but are not limited to Microsoft Internet Explorer™, Netscape Navigator™, or a specialized interface) running on an administrative computer 48 that is also connected to network 30 (or network 32).

Media distribution system 14 distributes media to users 12, 16, 18, 20, 22, 24, 26, such that the media distributed may be in the form of remote media data streams and/or local media data files. Examples of the types of media distributed by media distribution system 14 include: audio files (examples of which include but are not limited to music files, audio news broadcasts, and audio sports broadcasts, for example); video files (examples of which include but are not limited to video footage that does not include sound, for example); audio/video files (examples of which include but are not limited to a/v news broadcasts, a/v sports broadcasts, movies and movie clips, and music videos, for example); and multimedia content (examples of which include but are no t limited to interactive presentations and slideshows, for example).

For example, if media distribution system 14 is a music distribution system, user 12 may be allowed to download music files (examples of which include but are not limited to MP3 files or AAC files), such that copies of the music files are transferred from computer 28 to client electronic device 38. Alternatively, media distribution system 14 may only allow user 12 to receive a media data stream of a data file. As discussed above, when a file is streamed from e.g., computer 28 to client electronic device 38, a copy of the file is not retained on client electronic device 38. Further, media distribution system 14 may allow user 12 to stream media data files and download media data files. An example of such a media distribution system may include but is not limited to the Rhapsody™ service offered by RealNetworks™ of Seattle, Wash.

As discussed above, when a user (examples of which include but are not limited to user 12) streams media (examples of which include but are not limited to songs, videos, etc) from computer 28, media distribution system 14 monitors the media streamed by the user in the form of a media history file 50. Users may save this history file 50 (or portions thereof) as a playlist, such that a playlist is a list of tracks (examples of which include but are not limited to songs, videos, etc) that media distribution system 14 will play in sequence, thus allowing user 12 to assemble custom music compilations (in the form of multiple playlists).

Accordingly, when user 12 uses client application 40 to play media streams served by media distribution system 14, a media history file 50 is maintained (by client application 40), which defines the media that had been streamed to user 12. While media history file 50 is typically maintained locally (e.g., maintained on client electronic device 38), media history file 50 may alternatively/additionally be maintained remotely (e.g., maintained on computer 28) as a remote media history file 50'.

Figure 2:
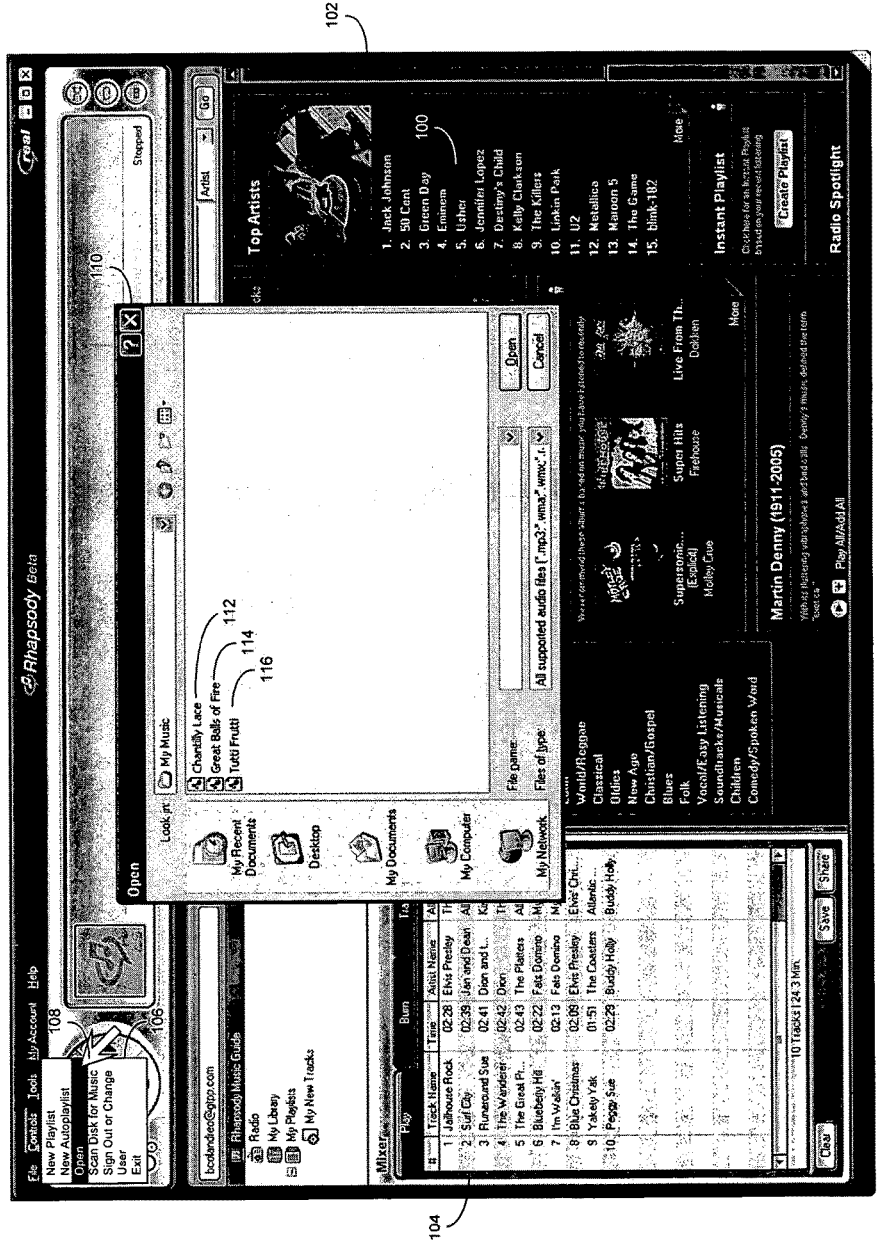
FIG. 2 is a display screen rendered by the playlist compilation system of FIG. 1.

Referring also to FIG. 2, upon accessing media distribution system 14, user 12 may be presented with a welcome display screen 100. Client application 40 typically includes a user interface 102 (e.g., a web browser) for interfacing with media distribution system 14 and viewing welcome display screen 100. A history window 104 may be included that itemizes the information contained within media history file 50. In this example, history window 104 itemizes ten (10) remote media streams (e.g., "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; and "Peggy Sue"), thus indicating that user 12 had previously listened to those ten (10) remote media streams.

In addition to remote media streams (i.e., media streams received from a remote device e.g., computer 28), client application 40 allows user 12 to play local media data files. As discussed above, a local media data file may be a purchased media data file (i.e., a file that was purchased by user 12), a tethered media data file (i.e., a file subscribed to by user 12), or a media data file extracted (i.e., ripped) from e.g., a music compact disc, for example. These local media data files are stored locally e.g., on storage device 42 coupled to client electronic device 38. As discussed above, examples of client electronic device 38 may be, but are not limited to, a client computer, a personal digital assistant, a cellular telephone, a television, a cable box, an internet radio, or a dedicated network device.

If user 12 wishes to play a local media data file (i.e., a file stored on client electronic device 38), user 12 may e.g., select the file(s) to be played using client application 40. Accordingly, user 12 may select the dropdown "File" menu 106 using screen pointer 108, which is controllable by a pointing device (e.g., a computer mouse, not shown). Selecting the "Open" command may result in client application 40 rendering file management window 110, which allows user 12 to select local media data files for playback.

In this example, file management window 110 defines three (3) local media data files, namely: "Chantilly Lace" 112; "Great Balls of Fire" 114; and "Tutti Frutti" 116, all of which are stored within the folder "My Music". User 12 may select any (or all) of these files for playback on client application 40.

Figure 3:
FIG. 3 is a display screen rendered by the playlist compilation system of FIG. 1.

Referring also to FIG. 3 and assuming that user 12 selects all three local media data files for playback, media history file 50 is amended to include three additional entries, namely one for "Chantilly Lace"; one for "Great Balls of Fire"; and one for "Tutti Frutti". Accordingly, as history window 104 itemizes the information contained within media history file 50, history window 104 will include three additional entries (i.e., entries 150, 152, 154), which correspond to local media data file "Chantilly Lace" 112; local media data file "Great Balls of Fire" 114; and local media data file "Tutti Frutti" 116.

Assuming that user 12 wishes to save this collection of music for future playback, user 12 may save the current media history file 50 (or a portion thereof) as a playlist 52 (FIG. 1). While playlist 52 is typically maintained locally (e.g., maintained on client electronic device 38), playlist 52 may alternatively/additionally be maintained remotely (e.g., maintained on computer 28) as a remote playlist 52'.

Figure 4:
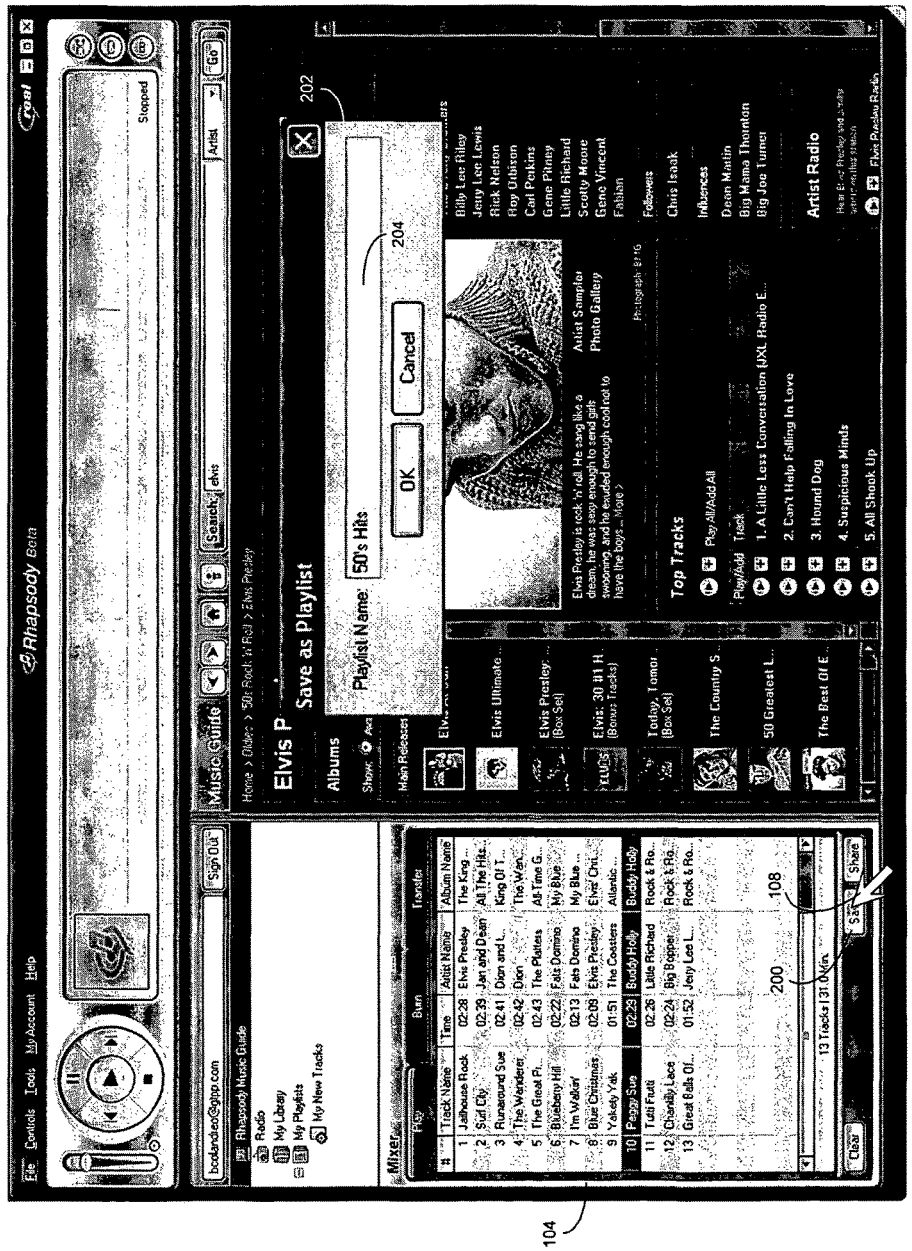
FIG. 4 is a display screen rendered by the playlist compilation system of FIG. 1.

Referring also to FIG. 4, user 12 may select the "save" button 200 (using screen pointer 108). Once the "save" button 200 is selected, a playlist naming window 202 is rendered (by playlist compilation system 10) that allows user 12 to specify a unique name for playlist 52 within the name field 204 of playlist naming window 202.

Assuming that user 12 selects "50's Hits" as a playlist name, playlist 52 is saved (i.e., as "50's Hits") and defines the location of all of the songs itemized within history window 104.

Figure 5:
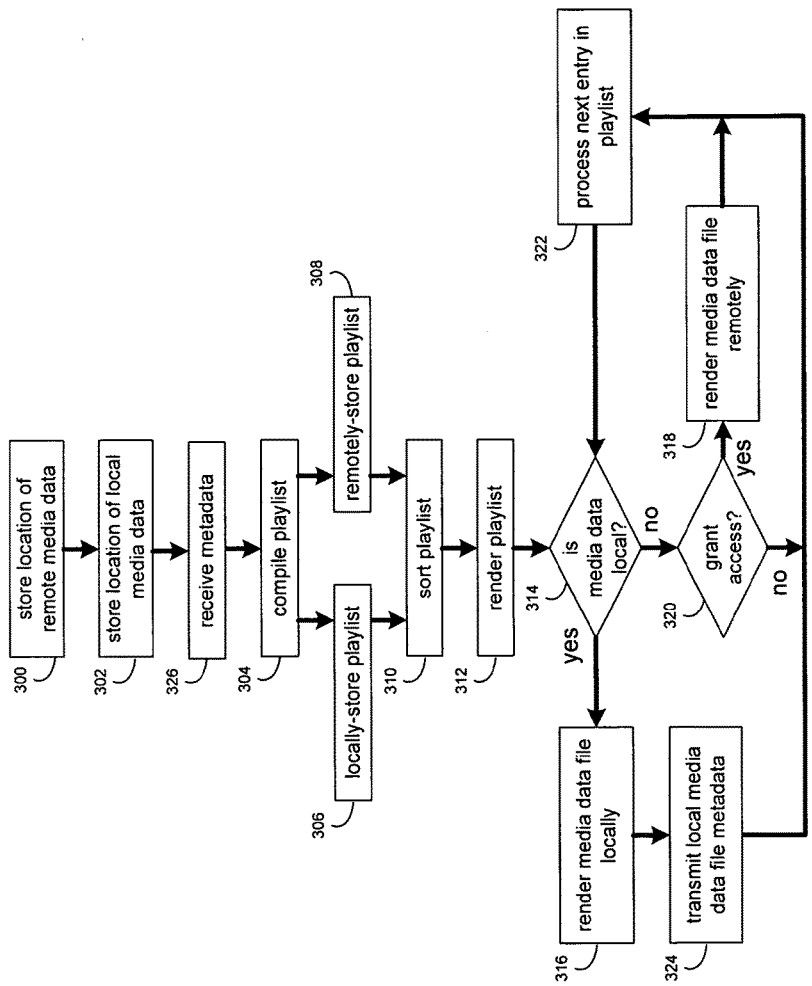
FIG. 5 is a flow chart of a process executed by the playlist compilation system of FIG. 1.

Referring also to FIG. 5, when user 12 chooses to save a playlist (i.e., in this example, playlist 52 named "50's Hits" that defines the location of ten (10) remote media streams and three (3) local media data files), playlist compilation system 10 stores 300 a location for each remote media stream included within playlist 52. This location information may be stored on the one or more memory architectures (not shown) incorporated into client electronic device 38 or on storage device 42 coupled to client electronic device 38, for example. An example of such a stream location may include a uniform resource locator (e.g., www.musicshop.com\songs\jailhouse_rock.ram); a file transfer protocol address (e.g., ftp://musicshop.com\songs\jailhouse_rock.ram; and/or and an internet protocol address (e.g., 192.168.1.163 \songs\jailhouse_rock.ram). Additionally, playlist compilation system 10 stores 302 a location for each local media data file included within playlist 52. This location information may be stored on the one or more memory architectures (not shown) incorporated into client electronic device 38 or on storage device 42 coupled to client electronic device 38, for example. An example of such a file location may include a drive; a path; and/or a filename (e.g., c:\my music\chantilly_lace.mp3). Once the locations of each remote media stream and each local media data file are defined, playlist compilation system 10 compiles 304 playlist 52, which is typically locally-stored 306 (e.g., playlist 52 on storage device 42 coupled to client electronic device 38). However, the playlist may be remotely-stored 308 (e.g., playlist 52' on storage device 34 coupled to computer 28).

Figure 6:
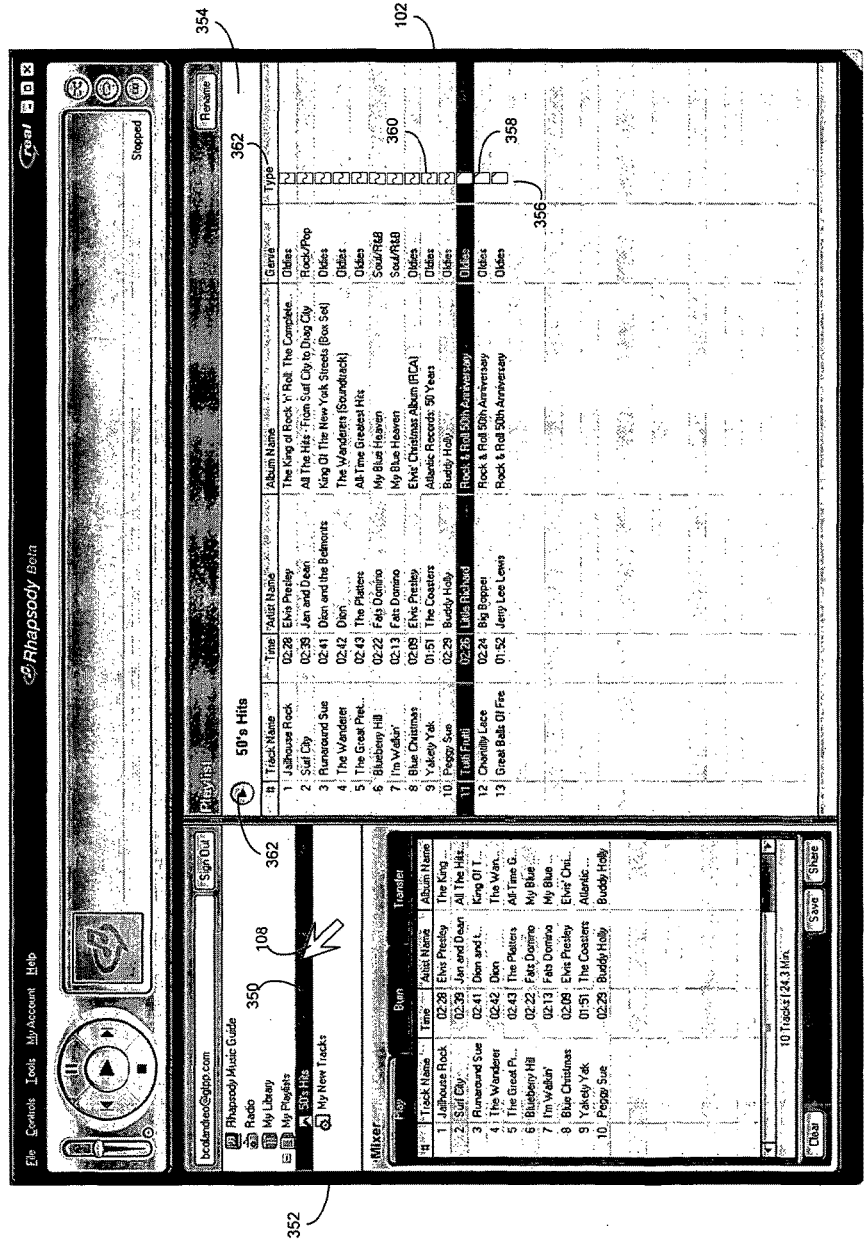
FIG. 6 is a display screen rendered by the playlist compilation system of FIG. 1.

Referring also to FIG. 6, once playlist 52 is compiled 304 and stored 306 (or 308), a link 350 to playlist 52 (e.g., "50's Hits") appears in directory window 352. User 12 may then select link 350 using screen pointer 108.

Once selected, the songs included within playlist 52 (e.g., "50's Hits") are itemized within a playlist window 354 (e.g., a web page) viewable via user interface 102. As discussed above, ten of these entries (namely "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; and "Peggy Sue") define the location of remote media streams and three of these entries (namely "Tutti Frutti"; "Chantilly Lace"; and "Great Balls of Fire") define the location of local media data files.

Typically, playlist window 354 includes hyperlinks that locate (i.e., provide addresses for) the streams/files associated with the individual entries itemized within playlist 52. This location information is stored within playlist 52. For example, the following table correlates the track name of an entry in playlist 52 with an address for the stream/file associated with that track name:

| Track Name | Address |
| --- | --- |
| Jailhouse Rock | www.musicshop.com\songs\jailhouse_rock.ram |
| Surf City | www.musicshop.com\songs\surf_city.ram |
| Runaround Sue | www.musicshop.com\songs\runaround_sue.ram |
| The Wanderer | www.musicshop.com\songs\the_wanderer.ram |
| The Great Pretender | www.musicshop.com\songs\the_great_pretender.ram |
| Blueberry Hill | www.musicshop.com\songs\blueberry_hill.ram |
| I'm Walkin' | www.musicshop.com\songs\im_walkin.ram |
| Blue Christmas | www.musicshop.com\songs\blue_christmas.ram |

-continued

| Track Name | Address |
| --- | --- |
| Yakety Yak | www.musicshop.com\songs\yakety_yak.ram |
| Peggy Sue | www.musicshop.com\songs\peggy_sue.ram |
| Tutti Frutti | c:\my music\tutti_frutti.mp3 |
| Chantilly Lace | c:\my music\chantilly_lace.mp3 |
| Great Balls of Fire | c:\my music\great_balls_of_fire.mp3 |

As the first ten entries (namely "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; and "Peggy Sue") identify remote media streams, the address provided for each entry points to a media stream available from e.g., media distribution system 14. Further, as the last three entries (namely "Tutti Frutti"; "Chantilly Lace"; and "Great Balls of Fire") identify local media data files, the address provided for each entry points to a media data file available from e.g., client electronic device 38.

Playlist window 354 is typically tabular and may include a column 356 identifying a media type (i.e., remote media stream or local media data file, for example) for each entry within the playlist window 354. Typically, column 356 includes icons that identify the media type (e.g., icon 358 identifies a local media data file and icon 360 identifies a remote media stream).

Typically, user 12 may sort 310 (FIG. 5) the playlist based upon media type. For example, if the local media data files and the remote media streams were intermingled within the playlist, user 12 may click on the "type" column heading 362 (via screen pointer 108) to sort the line items within the playlist based upon media type (resulting in the line items being ordered in the manner shown in playlist window 354). Additionally, if user 12 clicked on "type" column heading 362 a second time, the local media data file entries (i.e., entries 11-13) may be moved to the top of the list, resulting in the remote media stream entries (i.e., entries 1-10) being moved to the bottom of the list.

Once playlist 52 is sorted in a manner that is agreeable with user 12, user 12 may select the "play" button 362 to render 312 (FIG. 5) playlist 52 in its current form (i.e., the manner in which it is currently sorted).

When processing playlist 52, client application 40 may processes each entry in playlist 52 to determine the location of the stream/file associated with that entry, so that the associated remote media stream/local media data file can be played. For example, concerning the first entry (i.e., Jailhouse Rock), being this is an entry that points toward a remote media stream (as opposed to a local media data file), client application 40 may first determine 314 if the media data file is available locally. If this media data file (i.e., Jailhouse Rock) is available locally (e.g., within c:\mymusic\), client application 40 may locally obtain and render 316 the media data file, resulting in the playing of "Jailhouse Rock". However, for this particular entry, the media data file is not available locally. Therefore, client application 40 may remotely obtain and render 318 the media data file from "www.musicshop.com\songs\jailhouse_rock.ram" (as specified above). This media data stream would typically be served by media distribution system 14 via computer 28.

As media distribution system 14 is typically subscription-based, user 12 may be required to be a member of media distribution system 14 prior to being able to receive the "Jailhouse Rock" media data stream from computer 28. Accordingly, prior to granting user 12 access to the "Jailhouse Rock" media data stream, client application 40 may verify that user 12 is a current subscriber to media distribution system 14. Therefore, if user 12 is a current subscriber, client application 40 will grant 320 user 12 access to the "Jailhouse Rock" media data stream. However, if client application 40 determines that user 12 is not a current subscriber, user 12 may be e.g., denied access to the "Jailhouse Rock" media data stream, or given conditional/reduced access (examples of which include but are not limited to the user being allowed to use the service for a limited trial period, limited track duration or at a lower sound quality).

When the "Jailhouse Rock" media data stream is completed, client application 40 would process 322 the next entry and obtain the media data stream for "Surf City" from "www.musicshop.com\songs\surf_city.ram" (as specified above). This media data stream would typically be served by media distribution system 14 via computer 28. This process would continue until all of the remote media data streams and local media data files specified within playlist 52 were played (or the playback process was altered or cancelled), regardless of whether the entry refers to a remote media data stream or a local media data file. For example, when the "Peggy Sue" media data stream is completed, client application 40 would process the entry for "Tutti Frutti" and play the appropriate local media data file (i.e., c:\my music\tutti_frutti.mp3), which is located on client electronic device 38.

As discussed above, media distribution system 14 typically provides media data streams and/or media data files to a plurality of users (e.g., users 12, 16, 18, 20, 22, 24, 26). Typically, metadata is associated with each remote media data stream provided by media distribution system 14. This metadata may include (but is not limited to) an artist identifier, an album identifier, a track identifier, an album cover image, and a music genre identifier, for example.

Accordingly, whenever e.g., user 12 plays a remote media data stream, media distribution system 14 may compile and save this metadata (on a per-user basis) to track e.g., listening trends and musical preferences of individual users, for example.

As discussed above, a local media data file (as opposed to a remote media data stream) may be a purchased media data file (e.g., a file that was purchased by user 12), a tethered media data file (e.g., a file subscribed to by user 12), or a media data file extracted (i.e., ripped) from e.g., a music compact disc, for example.

If the purchased media data files and/or the tethered media data files were provided by media distribution system 14, these local media data files would typically also include the metadata described above. Accordingly, when these purchased or tethered media data files are played by user 12, the metadata concerning these purchased/tethered media data files may be transmitted 324 (FIG. 5) to computer 28, such that the metadata is compiled and saved (on a per user basis) to track e.g., listening trends and musical preferences, for example.

However, for local media data files that were e.g., extracted from music compact discs, these data files may not include the above-described metadata. As discussed above, local media data files (i.e., files stored on client electronic device 38) may to be played using client application 40 and added to playlists. Accordingly, whenever user 12 attempts to add a local media data file (that does not include metadata) to a playlist (e.g., playlist 52), user 12 may be prompted to provide metadata concerning that local media data file.

Figure 7:
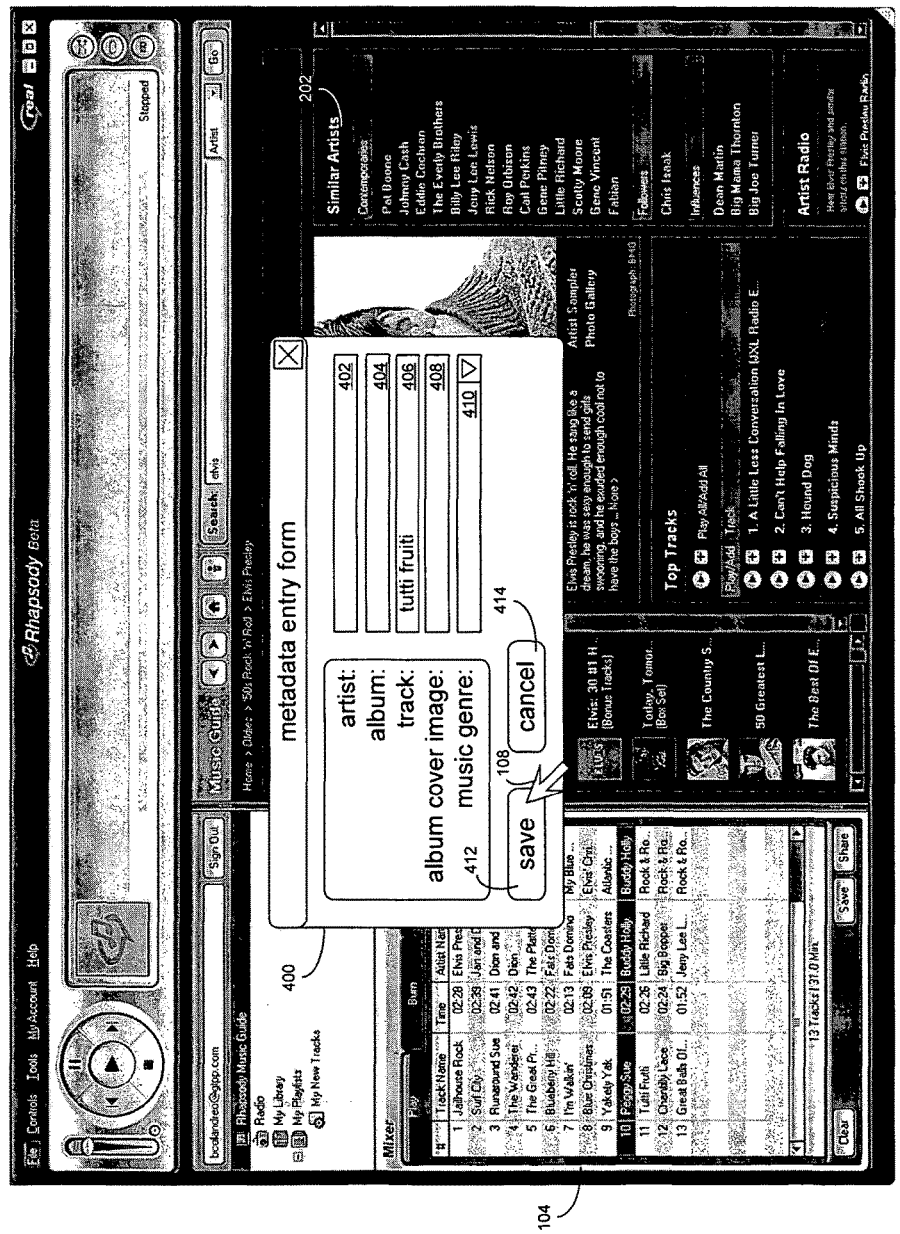
FIG. 7 is a display screen rendered by the playlist compilation system of FIG. 1.

Referring also to FIG. 7 and continuing with the above stated example, if user 12 attempts to save a playlist (e.g., playlist 52) that includes three local media data files (namely "Tutti Frutti"; "Chantilly Lace"; and "Great Balls of Fire"), assuming that these three local media data files do not include metadata, playlist compilation system 10 may render a metadata entry form 400 that allows user 12 to enter metadata concerning each of the three local media data files.

In this example, metadata entry form 400 includes five user-editable fields, namely an artist field 402, an album field 404, a track field 406, an album cover image field 408, and a music genre field 410. Album cover image field 408 may allow user 12 to define a drive, a path, and a filename for an album cover image. Music genre field 410 may be a drop-down menu (operable via screen pointer 108) that allows user 12 to select a music genre from a number of predefined music genres (not shown).

Typically, if the title of the local media data file is descriptive of the track name, the track field 406 may be populated with what playlist compilation system 10 suspects is the song title. As the first local media data file is named "tutti frutti", track field 406 would typically be populated with the suspected name "tutti frutti". User 12 may populate the remaining fields and select the save button 412 (using screen pointer 108) or alternatively select the cancel button 414.

In order to further automate the metadata generation process, client application 40 may interface with a remote metadata database (not shown) served by e.g., media distribution system 14 or a third party (not shown). This metadata database may define metadata for various tracks and albums. An example of such a database is the CDDB™ database maintained by Gracenote™ of Emeryville, Calif. (www.gracenote.com). For example, if user 12 ripped each track from an entire compact disc, the metadata database may be accessed by playlist compilation system 10 and a query may be structured that defines e.g., the total number of tracks included on the compact disc, the length of each track included on the compact disc, and the total length of the compact disc. Assuming that a definitive result is produced by this query, the metadata for each track ripped from the compact disc would be produced. In the event that an indefinite result set (i.e., one that identifies multiple possible compact discs) is generated, user 12 may be prompted to select the appropriate compact disc from a list of possible matches (not shown).

Accordingly, playlist compilation system 10 defines metadata for local media data files that were e.g., extracted from music compact discs. Therefore, when these local media data files are played (by client application 40), the metadata concerning these media data files may be transmitted 324 (FIG. 5) to computer 28, such that this metadata is compiled and saved (on a per-user basis) to track e.g., listening trends and musical preferences.

The metadata described above may be incorporated into playlist 52. As described above, this metadata may include (but is not limited to) an artist identifier, an album identifier, a track identifier, an album cover image, and a music genre identifier, for example. Additionally, the metadata may include a location identifier that defines the location of the media data file. For example, the metadata for "Tutti Frutti" may include: "Little Richard" (i.e., the artist identifier); "Specialty Records Greatest Hits" (i.e., the album identifier); "Tutti Frutti" (i.e., the track identifier); "home, oldies, 50's rock 'n' roll" (i.e., the music genre identifier); and "c:\my music\tutti_frutti.mp3" (i.e., the location identifier).

Computer 28 and media distribution system 14 may use the above-described metadata (transmitted 324 by client electronic device 38 to computer 28) to generate suggested playlists (not shown) that are based upon the listening habits and preferences of the user (or a group of users). For example and as discussed above, the music genre for "Tutti Frutti" is "home, oldies, 50's rock 'n' roll". Accordingly, a person that likes "Tutti Frutti" is likely to enjoy other 50" artists, such as "Elvis Presley", "Jan and Dean", "Dion", "The Platters", "Fats Domino", "The Coasters" and "Buddy Holly", for example.

Accordingly, media distribution system 14 may generate suggested metadata 54 that defines one or more tracks, artists, and albums that a user (e.g., user 12) is likely to enjoy due to the user's listening history (or the listening history of a group of users). Client electronic device 38 may receive 326 suggested metadata 54 from computer 28 and compile 304 a suggested playlist 56 for the user. This suggested playlist 56 may then be saved by the user on e.g., client electronic device 38 and/or computer 28.

Playlists may be modified and entries may be added to (or removed from) a playlist. Unfortunately, as a playlist grows large, it is foreseeable that a user (e.g., user 12) may inadvertently add the same track to a playlist multiple times.

Figure 8:
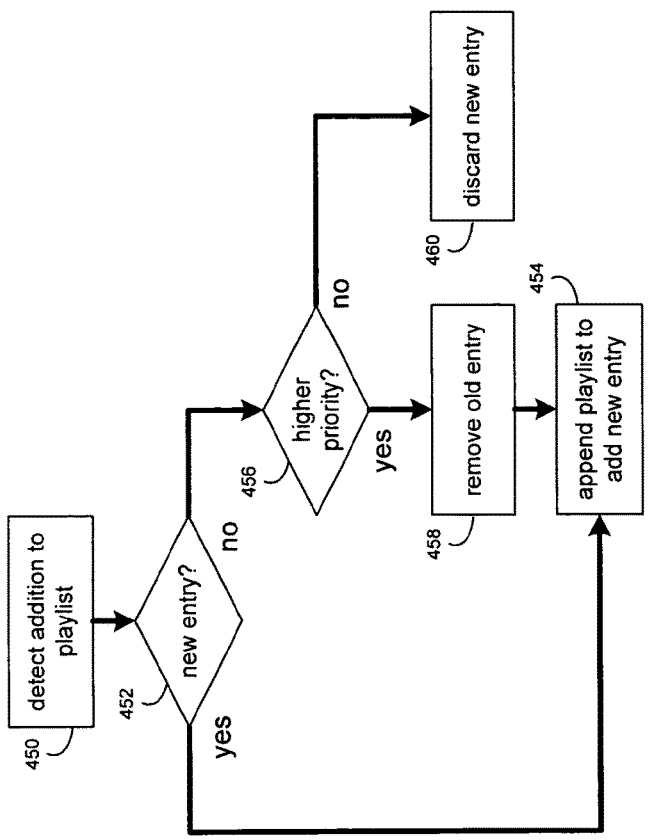
FIG. 8 is a flow chart of a process executed by the playlist compilation system of FIG. 1.

Referring also to FIG. 8, playlist compilation system 10 monitors any additions and deletions being made to a playlist (e.g., playlist 52). Accordingly, when playlist compilation system 10 detects 450 that a playlist is being appended to define the location of a new media data file, a determination 452 is made concerning whether the playlist already includes an entry that locates a media data file that corresponds to the new media data file. For example, if user 12 wished to add "tutti frutti" to playlist 52, playlist compilation system 10 would examine playlist 52 and determine 452 that playlist 52 already included an entry for "tutti frutti".

Typically, playlist compilation system 10 makes determination 452 by comparing the metadata (e.g., artist identifiers, album identifiers, and track identifiers, for example) of the media data file associated with each current entry in playlist 52 to the metadata of the new media data file to be added to playlist 52. Therefore, playlist compilation system 10 would typically allow user 12 to add multiple renditions of a single song (as performed by a single artist on multiple albums, or by multiple artists), as the metadata for each of these media data files would differ.

If playlist compilation system 10 determines 452 that playlist 52 does not include an entry (i.e., does not include metadata) that locates a media data file that corresponds to the new media data file to be added to playlist 52, playlist compilation system 10 appends 454 playlist 52 to include an entry that defines the location of the new media data file. When appending 454 playlist 52, playlist compilation system 10 may append playlist 52 to include metadata that locates the new media data file.

If playlist compilation system 10 determines 452 that playlist 52 includes an entry (i.e., includes metadata) that locates a media data file that corresponds to the new media data file to be added to playlist 52, playlist compilation system 10 determines 456 which of the two media data files (i.e., the existing media data file currently located by playlist 52 or the new media data file to be located by playlist 52) has a higher priority.

As discussed above, media data files may be purchased media data files (e.g., a media data file that was purchased by user 12 and is currently owned by user 12); tethered media data files (e.g., a file that is useable by user 12 provided that e.g., user 12 continues to pay a monthly subscription fee), or remote media data files (e.g., remote media data streams that are not owned by user 12). Typically, the priority of a media data file is based upon its file type. For example, a purchased media data file has the highest priority; a tethered media data file has a medium priority; and a remote media data file has the lowest priority.

Accordingly, when determining priority 456, the file type of each file (i.e., the existing media data file currently located by playlist 52 and the new media data file to be located by playlist 52) is examined. If the priority of the new media data file to be added to playlist 52 exceeds the priority of the corresponding media data file currently located by playlist 52, playlist 52 is modified by playlist compilation system 10 to: remove 458 the entry that locates the corresponding media data file; and add 454 an entry that defines the location of the new media data file. When appending 454 playlist 52, playlist compilation system 10 may append playlist 52 to include metadata that locates the new media data file. Additionally, when removing 458 the entry that locates the corresponding media data file, playlist compilation system 10 may remove the metadata related to the corresponding media file.

Alternatively, if the priority of the new media data file to be added to playlist 52 does not exceed the priority of the corresponding media data file currently located by playlist 52, playlist 52 is not modified by playlist compilation system 10 and the new entry is discarded 460.

While playlist compilation system 10 is described above as typically being a component of client application 40, such that the instruction sets and subroutines of client application 40 and playlist compilation system 10 are typically stored on a storage device 42 coupled to client electronic device 38, other configurations are possible.

For example, playlist compilation system 10' may be exclusively or partially executed by computer 28 (i.e., the computer that executes media distribution system 14). Accordingly and as discussed above, media history file 52' may be stored remotely (e.g., on computer 28). Further and as discussed above, this history file may define both remote media data streams and local media data files. Therefore, since a history file (or a portion thereof) may be saved as a playlist and playlist(s) may be stored remotely (e.g., on computer 28), playlist compilation system 10' may be a server application executed by computer 28. Alternatively, playlist compilation system 10' may be a component of media distribution system 14 (e.g., an embedded feature of media distribution system 14, a software plug-in for media distribution system 14, or a stand-alone application called from within and controlled by media distribution system 14, for example). Accordingly, the instruction sets and subroutines of playlist compilation system 10', which may be stored on storage device 34 coupled to computer 28, may be executed by one or more processors (not shown) and one or more memory architectures (not shown) incorporated into computer 28.

As a copy of the same playlist may be stored locally (e.g., on client electronic device 38) and remotely (e.g., on computer 28), playlist compilation system 10 automatically synchronizes the locally-stored playlist(s) with the remotely-stored playlist(s) at the time the user (e.g., user 12) logs in to media distribution system 14.

For example and as discussed above, user 12 saves a playlist entitled "50's Hits", which is either locally-stored 306 (e.g., on client electronic device 38) or remotely-stored 308 (e.g., on computer 28). Regardless of the location at which the playlist is stored, the playlist is typically automatically synchronized to the other storage location. For example, if playlist 52 is locally-stored 306, the playlist will subsequently be automatically synchronized onto computer 28. Alternatively, if playlist 52 is remotely-stored 308, the playlist will subsequently be automatically synchronized onto client electronic device 38. This initial synchronization function (between e.g., client electronic device 38 and computer 28) typically occurs at (or very close to) the time that the playlist (e.g., playlist 52) is initially either locally-stored 306 (e.g., on client electronic device 38) or remotely-stored 308 (e.g., on computer 28).

Accordingly, once user 12 creates playlist 52, by the time user 12 logs out of media distribution system 14, the newly-created playlist (e.g., playlist 52) typically has already been synchronized between the remote device (e.g., computer 28) and the local device (e.g., client electronic device 38).

Figure 9:
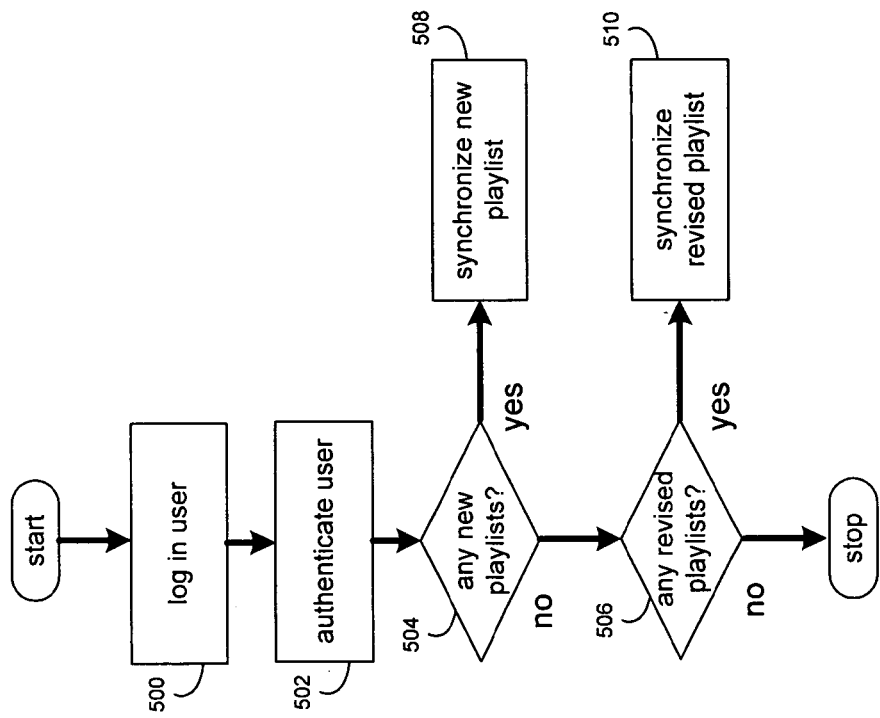
FIG. 9 is a flow chart of a process executed by the playlist compilation system of FIG. 1.

Referring also to FIG. 9, whenever user 12 logs in 500 to media distribution system 14, user 12 may be authenticated 502. User 12 may log into a server in media distribution system 14 that includes the playlist or a special authentication server (not shown). This authentication process may, for example, include the verification of a username/password, the verification of an active subscription (e.g. the subscription is current and/or been paid), the transmission of a cookie, and/or the use of encryption keys. Once the user is authenticated 502, the locally-stored playlists may be compared 504 to the remotely-stored playlists to determine if either device (e.g., the remote device or the local device) contains any new playlists that are not present on the other device. This playlist comparison process typically includes a version comparison process for comparing 506 the versions of common playlists (i.e., playlists that are present on both the remote device and the local device) to verify whether each device has the newest version of any common playlist.

Typically, this version comparison process may be made by e.g., comparing the time/date stamp of each playlist or the data within the playlist itself. Accordingly, the newest playlist would have the most-recent time/date stamp. Alternatively, each time a playlist is modified, a version number associated with that playlist may be incremented. Accordingly, the newest playlist would have the highest version number.

When comparing 504 the locally-stored playlists to the remotely-stored playlists, in the event that one device (e.g., the remote device) contains a playlist that is not present on the other device (e.g., the local device), the local device and the remote device are synchronized 508.

For example, assume that user 12 creates playlist 52 using a first client electronic device (e.g., client electronic device 38). As discussed above, prior to logging out of media distribution system 14, synchronization occurs and playlist 52 is typically present on both the local device (e.g., client electronic device 38) and the remote device (e.g., computer 28). If user 12 subsequently logs in 500 and is authenticated 502 using a second client electronic device (not shown), when comparing 504 the playlists on the remote device (e.g., computer 28) to the playlists on the local device (e.g., the second client electronic device, not shown), it will be determined that playlist 52 is not present on the second client electronic device. Accordingly, the two devices will be synchronized 508 and playlist 52, or missing entries therein, will be copied from the remote device (e.g., computer 28) to the local device (e.g., the second client electronic device, not shown). Further, assume that user 12 modifies playlist 52 by adding an additional song. As discussed above, prior to logging out of media distribution system 14, synchronization occurs and a copy of the modified playlist will be present on both the remote device (e.g., computer 28) and the local device (e.g., the second client electronic device, not shown).

When comparing 506 the versions of common playlists, in the event that one device (e.g., the remote device) contains a newer version of a common playlist than that stored on the other device (e.g., the local device), the local device and the remote device may be synchronized 510.

Continuing with the above-stated example, since user 12 modified playlist 52 using the second client electronic device (not shown), that modified version of playlist 52 may not be present on client electronic device 38. However, the original "unmodified" version of playlist 52 may be present on client electronic device 38. Accordingly, if user 12 subsequently logs in 500 and is authenticated 502 using client electronic device 38, when comparing 504 the playlists on the remote device to the playlists on the local device, it may be determined that playlist 52 is a common playlist, as it is present on both the local and remote devices. However, when comparing 506 the versions of the common playlists (e.g., playlist 52), the version on the remote device (e.g., computer 28) may be newer than the version on client electronic device 38, as user 12 used a second client electronic device (not shown) to modify playlist 52. Accordingly, the two devices may be synchronized 510 and the newer version of playlist 52 may be copied from the remote device (e.g., computer 28) to the local device (e.g., client electronic device 38).

A number of implementations have been described. Nevertheless, it will be understood that various modifications may be made. Accordingly, other implementations are within the scope of the following claims.

What is claimed is:

1. A cellular client electronic device that is capable, when the cellular client electronic device is in operation, of communicating with a remote server system via at least one network, the at least one network comprising at least one Internet network, the cellular client electronic device comprising:

a display for use, at least in part, in displaying media-related information;

at least one processor; and storage capable of storing, at least in part, client application instructions that are capable of being executed, at least in part, by the at least one processor, the client application instructions, when executed, at least in part, by the at least one processor resulting, at least in part, in the cellular client electronic device being capable of performing operations comprising:

receiving, at least in part, via a user interface of the cellular client electronic device, at least one user input that requests, at least in part, accessing of at least one server-suggested media playlist generated, at least in part, by the remote server system based, at least in part, upon user media preference data and user media history data, the user media preference data to be provided, at least in part, by a user of the cellular client electronic device, the at least one server-suggested media playlist being capable of being stored, at least in part, in the cellular client electronic device and/or in the remote server system, the at least one server-suggested media playlist being capable of comprising at least one listing that indicates, at least in part, media data items that are to be played in a sequence defined, at least in part, by the at least one media playlist, the media data items being capable of comprising at least one media data item and at least one other media data item; and receiving, at least in part, via the user interface, at least one additional user input that requests playing, at least in part, of the at least one server-suggested media playlist, the playing, at least in part, of the at least one server-suggested media playlist being capable of being based, at least in part, upon at least one media stream to be received, at least in part, from the remote server system via the at least one network, for use in the playing of the at least one server-suggested media playlist;

wherein:

the at least one media stream is to be provided, at least in part, by the remote server system to the cellular client electronic device based, at least in part, upon whether the user of the cellular client electronic device is a subscriber of at least one subscription-based service associated, at least in part, with the remote server system, the remote server system being capable of providing at least one relatively reduced service, relative to the at least one subscription-based service, for a non-subscriber of the at least one subscription-based service;

the cellular client electronic device is capable, when the cellular client electronic device is in the operation, of downloading, at least in part, from the remote server system for storing, at least in part, in the storage, the at least one media data item and/or the at least one other media data item, the at least one media data item and the at least one other media data item when stored in the storage being usable by the user only so long as the user remains subscribed to the at least one subscription-based service;

the remote server system is capable of providing the at least one server-suggested media playlist to another client electronic device associated with the user;

the at least one server-suggested media playlist is capable of being modified, at least in part, based upon at least one further user input provided via the user interface, to generate at least one modified media playlist; and the remote server system is also capable of synchronizing, at least in part, across the cellular client electronic device and the another client electronic device, the at least one modified media playlist.

2. The cellular client electronic device of claim 1, wherein:

the cellular client electronic device also is capable, when the cellular client electronic device is in the operation, of executing an operating system;

the operating system is based, at least in part, upon a Linux operating system; and the at least one media data item and the at least one other media data item comprise media tracks.

3. The cellular client electronic device of claim 1, wherein:

the at least one media data item is to be stored, at least in part, in the storage;

the at least one other media data item to be stored, at least in part, at the remote server system, the at least one other media data item being unavailable for retrieval, at least in part, from the storage for playing by the cellular client electronic device; and the at least one media stream is to correspond, at least in part, to the at least one other media data item.

4. The cellular client electronic device of claim 1, wherein:

the cellular client electronic device is capable, when the cellular client electronic device is in the operation, of beginning to play, at least in part, the at least one media stream prior to the at least one media stream being entirely received by the cellular client electronic device.

5. The cellular client electronic device of claim 1, wherein:

the cellular client electronic device is capable, when the cellular client electronic device is in the operation, of displaying, via the display, respective icons in association with respective media data items in the at least one media playlist;

the respective icons are to indicate whether the respective media data items are stored in the remote server system or in the cellular client electronic device.

6. The cellular client electronic device of claim 1, wherein:

the cellular client electronic device comprises a cellular telephone device;

the operations also comprise:

displaying, at least in part, via the display, at least one icon in association with the at least one other media data item and the at least one server-suggested media playlist, the at least one icon being to indicate that the at least one other media data item is stored, at least in part, at the remote server system instead of being stored, at least in part, in the storage; and receiving, at least in part, via the user interface, at least one yet further user input that requests, at least in part, change in manner of display, via the display, of the at least one server-suggested media playlist based, at least in part, upon whether at least one certain media data item associated, at least in part, with the at least one server-suggested media playlist is stored, at least in part, at the remote server system or at the cellular client electronic device, the at least one certain media data item being capable of being selected, at least in part, via the user interface, for playing by the cellular client electronic device.

7. The cellular client electronic device of claim 1, wherein:

the at least one media item comprises at least one purchased media item, the at least one purchased media item being purchased via the remote server system.

8. A method implemented, at least in part, using a cellular client electronic device that is capable, when the cellular client electronic device is in operation, of communicating with a remote server system via at least one network, the at least one network comprising at least one Internet network, the cellular client electronic device comprising a display, at least one processor, and storage, the method comprising:

executing, at least in part by the at least one processor, client application instructions stored, at least in part, in the storage, the client application instructions, when executed, at least in part, by the at least one processor resulting, at least in part, in the cellular client electronic device being capable of performing operations comprising:

receiving, at least in part, via a user interface of the cellular client electronic device, at least one user input that requests, at least in part, accessing of at least one server-suggested media playlist generated, at least in part, by the remote server system based, at least in part, upon user media preference data and user media history data, the user media preference data to be provided, at least in part, by a user of the cellular client electronic device, the at least one server-suggested media playlist being capable of being stored, at least in part, in the cellular client electronic device and/or in the remote server system, the at least one server-suggested media playlist being capable of comprising at least one listing that indicates, at least in part, media data items that are to be played in a sequence defined, at least in part, by the at least one media playlist, the media data items being capable of comprising at least one media data item and at least one other media data item; and receiving, at least in part, via the user interface, at least one additional user input that requests playing, at least in part, of the at least one server-suggested media playlist, the playing, at least in part, of the at least one server-suggested media playlist being capable of being based, at least in part, upon at least one media stream to be received, at least in part, from the remote server system via the at least one network, for use in the playing of the at least one server-suggested media playlist;

wherein:

the at least one media stream is to be provided, at least in part, by the remote server system to the cellular client electronic device based, at least in part, upon whether the user of the cellular client electronic device is a subscriber of at least one subscription-based service associated, at least in part, with the remote server system, the remote server system being capable of providing at least one relatively reduced service, relative to the at least one subscription-based service, for a non-subscriber of the at least one subscription-based service;

the cellular client electronic device is capable, when the cellular client electronic device is in the operation, of downloading, at least in part, from the remote server system for storing, at least in part, in the storage, the at least one media data item and/or the at least one other media data item, the at least one media data item and the at least one other media data item when stored in the storage being usable by the user only so long as the user remains subscribed to the at least one subscription-based service;

the remote server system is capable of providing the at least one server-suggested media playlist to another client electronic device associated with the user;

the at least one server-suggested media playlist is capable of being modified, at least in part, based upon at least one further user input provided via the user interface, to generate at least one modified media playlist; and the remote server system is also capable of synchronizing, at least in part, across the cellular client electronic device and the another client electronic device, the at least one modified media playlist.

9. The method of claim 8, wherein:
the cellular client electronic device also is capable, when the cellular client electronic device is in the operation, of executing an operating system;
the operating system is based, at least in part, upon a Linux operating system; and
the at least one media data item and the at least one other media data item comprise media tracks.

10. The method of claim 8, wherein:
the at least one media data item is to be stored, at least in part, in the storage;
the at least one other media data item to be stored, at least in part, at the remote server system, the at least one other media data item being unavailable for retrieval, at least in part, from the storage for playing by the cellular client electronic device; and
the at least one media stream is to correspond, at least in part, to the at least one other media data item.

11. The method of claim 8, wherein:
the cellular client electronic device is capable, when the cellular client electronic device is in the operation, of beginning to play, at least in part, the at least one media stream prior to the at least one media stream being entirely received by the cellular client electronic device.

12. The method of claim 8, wherein:
the cellular client electronic device is capable, when the cellular client electronic device is in the operation, of displaying, via the display, respective icons in association with respective media data items in the at least one media playlist;
the respective icons are to indicate whether the respective media data items are stored in the remote server system or in the cellular client electronic device.

13. The method of claim 8, wherein:
the cellular client electronic device comprises a cellular telephone device;
the operations also comprise:
displaying, at least in part, via the display, at least one icon in association with the at least one other media data item and the at least one server-suggested media playlist, the at least one icon being to indicate that the at least one other media data item is stored, at least in part, at the remote server system instead of being stored, at least in part, in the storage; and
receiving, at least in part, via the user interface, at least one yet further user input that requests, at least in part, change in manner of display, via the display, of the at least one server-suggested media playlist based, at least in part, upon whether at least one certain media data item associated, at least in part, with the at least one server-suggested media playlist is stored, at least in part, at the remote server system or at the cellular client electronic device, the at least one certain media data item being capable of being selected, at least in part, via the user interface, for playing by the cellular client electronic device.

14. The method of claim 8, wherein:
the at least one media item comprises at least one purchased media item, the at least one purchased media item being purchased via the remote server system.

15. Non-transitory computer-readable storage storing instructions that when executed, at least in part, by a cellular client electronic device results in the cellular client electronic device being capable of performing operations, the cellular client electronic device being capable, when the cellular client electronic device is in operation, of communicating with a remote server system via at least one network, the at least one network comprising at least one Internet network, the cellular client electronic device comprising a display, the operations comprising:
receiving, at least in part, via a user interface of the cellular client electronic device, at least one user input that requests, at least in part, accessing of at least one server-suggested media playlist generated, at least in part, by the remote server system based, at least in part, upon user media preference data and user media history data, the user media preference data to be provided, at least in part, by a user of the cellular client electronic device, the at least one server-suggested media playlist being capable of being stored, at least in part, in the cellular client electronic device and/or in the remote server system, the at least one server-suggested media playlist being capable of comprising at least one listing that indicates, at least in part, media data items that are to be played in a sequence defined, at least in part, by the at least one media playlist, the media data items being capable of comprising at least one media data item and at least one other media data item; and receiving, at least in part, via the user interface, at least one additional user input that requests playing, at least in part, of the at least one server-suggested media playlist, the playing, at least in part, of the at least one server-suggested media playlist being capable of being based, at least in part, upon at least one media stream to be received, at least in part, from the remote server system via the at least one network, for use in the playing of the at least one server-suggested media playlist;

wherein:
the at least one media stream is to be provided, at least in part, by the remote server system to the cellular client electronic device based, at least in part, upon whether the user of the cellular client electronic device is a subscriber of at least one subscription-based service associated, at least in part, with the remote server system, the remote server system being capable of providing at least one relatively reduced service, relative to the at least one subscription-based service, for a non-subscriber of the at least one subscription-based service;

the cellular client electronic device is capable, when the cellular client electronic device is in the operation, of downloading, at least in part, from the remote server system for storing, at least in part, in the cellular client electronic device, the at least one media data item and/or the at least one other media data item, the at least one media data item and the at least one other media data item when stored in the cellular client electronic device being usable by the user only so long as the user remains subscribed to the at least one subscription-based service;

the remote server system is capable of providing the at least one server-suggested media playlist to another client electronic device associated with the user;

the at least one server-suggested media playlist is capable of being modified, at least in part, based upon at least one further user input provided via the user interface, to generate at least one modified media playlist; and the remote server system is also capable of synchronizing, at least in part, across the cellular client electronic device and the another client electronic device, the at least one modified media playlist.

16. The non-transitory computer-readable storage of claim 15, wherein:
the cellular client electronic device also is capable, when the cellular client electronic device is in the operation, of executing an operating system;
the operating system is based, at least in part, upon a Linux operating system; and the at least one media data item and the at least one other media data item comprise media tracks.

17. The non-transitory computer-readable storage of claim 15, wherein:
the at least one media data item is to be stored, at least in part, in the cellular client electronic device;
the at least one other media data item to be stored, at least in part, at the remote server system, the at least one other media data item being unavailable for retrieval, at least in part, from the cellular client electronic device for playing by the cellular client electronic device; and
the at least one media stream is to correspond, at least in part, to the at least one other media data item.

18. The non-transitory computer-readable storage of claim 15, wherein:
the cellular client electronic device is capable, when the cellular client electronic device is in the operation, of beginning to play, at least in part, the at least one media stream prior to the at least one media stream being entirely received by the cellular client electronic device.

19. The non-transitory computer-readable storage of claim 15, wherein:
the cellular client electronic device is capable, when the cellular client electronic device is in the operation, of displaying, via the display, respective icons in association with respective media data items in the at least one media playlist;
the respective icons are to indicate whether the respective media data items are stored in the remote server system or in the cellular client electronic device.

20. The non-transitory computer-readable storage of claim 15, wherein:
the cellular client electronic device comprises a cellular telephone device;
the operations also comprise:
displaying, at least in part, via the display, at least one icon in association with the at least one other media data item and the at least one server-suggested media playlist, the at least one icon being to indicate that the at least one other media data item is stored, at least in part, at the remote server system instead of being stored, at least in part, in the cellular client electronic device; and
receiving, at least in part, via the user interface, at least one yet further user input that requests, at least in part, change in manner of display, via the display, of the at least one server-suggested media playlist based, at least in part, upon whether at least one certain media data item associated, at least in part, with the at least one server-suggested media playlist is stored, at least in part, at the remote server system or at the cellular client electronic device, the at least one certain media data item being capable of being selected, at least in part, via the user interface, for playing by the cellular client electronic device.

21. The non-transitory computer-readable storage of claim 15, wherein:
the at least one media item comprises at least one purchased media item, the at least one purchased media item being purchased via the remote server system.

22. A cellular client electronic device that is for, when the cellular client electronic device is in operation, communicating with a remote server system via one or more networks, the one or more networks comprising one or more Internet networks, the cellular client electronic device comprising:

a display for use in displaying media-related information;
one or more processors; and
storage for storing client application instructions that are for being executed, at least in part, by the one or more processors, the client application instructions, when executed, at least in part, by the one or more processors resulting in the cellular client electronic device being for performing operations comprising:
receiving, via a user interface of the cellular client electronic device, one or more user inputs that request accessing of one or more server-suggested media playlists generated by the remote server system based upon user media preference data and user media history data, the user media preference data to be provided by a user of the cellular client electronic device, the one or more server-suggested media playlists being for being stored in the cellular client electronic device and/or in the remote server system, the one or more server-suggested media playlists comprising one or more listings that indicate media data items that are to be played in a sequence defined by the one or more media playlists, the media data items comprising one or more media data items and one or more other media data items; and
receiving via the user interface, one or more additional user inputs that request playing of the one or more server-suggested media playlists, playing of the one or more server-suggested media playlists being based upon one or more media streams to be received from the remote server system via the one or more networks, for use in playing of the one or more server-suggested media playlists;
wherein:
the one or more media streams are to be provided by the remote server system to the cellular client electronic device based upon whether the user of the cellular client electronic device is a subscriber of one or more subscription-based services associated with the remote server system, the remote server system being for providing one or more relatively reduced services, relative to the one or more subscription-based services, for a non-subscriber of the one or more subscription-based services;
the cellular client electronic device is for, when the cellular client electronic device is in the operation, of downloading from the remote server system for storing in the storage, the one or more media data items and/or the one or more other media data items, the one or more media data items and the one or more other media data items when stored in the storage being usable by the user only so long as the user remains subscribed to the one or more subscription-based services;
the remote server system is for providing the one or more server-suggested media playlists to another client electronic device associated with the user;
the one or more server-suggested media playlists are for being modified based upon one or more further user inputs provided via the user interface, to generate one or more modified media playlists; and
the remote server system is also for synchronizing, across the cellular client electronic device and the another client electronic device, the one or more modified media playlists.

23. The cellular client electronic device of claim 22, wherein:
the cellular client electronic device also is for, when the cellular client electronic device is in the operation, of executing an operating system;
the operating system is based upon a Linux operating system;
the one or more media data items and the one or more other media data items comprise media tracks;
the one or more media data items are to be stored in the storage;
the one or more other media data items are to be stored at the remote server system, the one or more other media data items being unavailable for retrieval from the storage for playing by the cellular client electronic device; and
the one or more media streams are to correspond to the one or more other media data items.

24. The cellular client electronic device of claim 22, wherein:
the cellular client electronic device is for, when the cellular client electronic device is in the operation, beginning to play the one or more media streams prior to the one or more media streams being entirely received by the cellular client electronic device;
the cellular client electronic device is for, when the cellular client electronic device is in the operation, displaying, via the display, respective icons in association with respective media data items in the one or more media playlists;
the respective icons are to indicate whether the respective media data items are stored in the remote server system or in the cellular client electronic device;
the cellular client electronic device comprises a cellular telephone device;
the operations also comprise:
displaying, via the display, one or more icons in association with the one or more other media data items and the one or more server-suggested media playlists, the one or more icons being to indicate that the one or more other media data items are stored at the remote server system instead of being stored in the storage; and
receiving, via the user interface, one or more yet further user inputs that request, change in manner of display, via the display, of the one or more server-suggested media playlists based upon whether one or more certain media data items associated with the one or more server-suggested media playlists are stored at the remote server system or at the cellular client electronic device, the one or more certain media data items being for being selected, via the user interface, for playing by the cellular client electronic device; and
the one or more media items comprise one or more purchased media items, the one or more purchased media items being purchased via the remote server system.

25. A server system that is capable of communicating with a cellular client electronic device, when the cellular client electronic device is in operation, via at least one network, the at least one network comprising at least one Internet network, the server system comprising:
at least one processor;
storage capable of storing, at least in part, instructions that are capable of being executed, at least in part, by the at least one processor, the instructions, when executed, at least in part, by the at least one processor resulting, at least in part, in the server system being capable of performing operations comprising:

permitting access, at least in part, to at least one server-suggested media playlist by the cellular client electronic device, the at least one server-suggested media playlist being generated, at least in part, by the server system based, at least in part, upon user media preference data and user media history data, the user media preference data to be provided, at least in part, by a user of the cellular client electronic device, the at least one server-suggested media playlist being capable of being stored, at least in part, in the cellular client electronic device and/or in the server system, the at least one server-suggested media playlist being capable of comprising at least one listing that indicates, at least in part, media data items that are to be played in a sequence defined, at least in part, by the at least one media playlist, the media data items being capable of comprising at least one media data item and at least one other media data item, the at least one server-suggested media playlist being capable of being played, at least in part, at the cellular client electronic device based, at least in part, upon at least one media stream to be provided, at least in part, from the server system via the at least one network to the cellular client electronic device for use in playing of the at least one server-suggested media playlist;

wherein:

the at least one media stream is to be provided, at least in part, by the server system to the cellular client electronic device based, at least in part, upon whether the user of the cellular client electronic device is a subscriber of at least one subscription-based service associated, at least in part, with the server system, the server system being capable of providing at least one relatively reduced service, relative to the at least one subscription-based service, for a non-subscriber of the at least one subscription-based service;

the cellular client electronic device is capable, when the cellular client electronic device is in the operation, of downloading, at least in part, from the server system for storing, at least in part, in the cellular client electronic device, the at least one media data item and/or the at least one other media data item, the at least one media data item and the at least one other media data item when stored in the cellular client electronic device being usable by the user only so long as the user remains subscribed to the at least one subscription-based service;

the server system is capable of providing the at least one server-suggested media playlist to another client electronic device associated with the user;

the at least one server-suggested media playlist is capable of being modified, at least in part, based upon at least one user input to be provided via a user interface of the cellular client electronic device, to generate at least one modified media playlist; and the server system is also capable of synchronizing, at least in part, across the cellular client electronic device and the another client electronic device, the at least one modified media playlist.

26. The server system of claim 25, wherein:
the cellular client electronic device also is capable, when the cellular client electronic device is in the operation, of executing an operating system;
the operating system is based, at least in part, upon a Linux operating system; and
the at least one media data item and the at least one other media data item comprise media tracks.

27. The server system of claim 25, wherein:
the at least one media data item is to be stored, at least in part, in the cellular client electronic device;
the at least one other media data item to be stored, at least in part, at the server system, the at least one other media data item being unavailable for retrieval, at least in part, from the storage for playing by the cellular client electronic device; and
the at least one media stream is to correspond, at least in part, to the at least one other media data item.

28. The server system of claim 25, wherein:
the cellular client electronic device is capable, when the cellular client electronic device is in the operation, of beginning to play, at least in part, the at least one media stream prior to the at least one media stream being entirely received by the cellular client electronic device.

29. The server system of claim 25, wherein:
the cellular client electronic device is capable, when the cellular client electronic device is in the operation, of displaying, via the display, respective icons in association with respective media data items in the at least one media playlist;
the respective icons are to indicate whether the respective media data items are stored in the server system or in the cellular client electronic device.

30. The server system of claim 25, wherein:
the cellular client electronic device comprises a cellular telephone device;
the cellular client electronic device is capable of:
displaying, at least in part, via the display, at least one icon in association with the at least one other media data item and the at least one server-suggested media playlist, the at least one icon being to indicate that the at least one other media data item is stored, at least in part, at the server system instead of being stored, at least in part, in the cellular client electronic device; and
receiving, at least in part, via the user interface, at least one further user input that requests, at least in part, change in manner of display, via the display, of the at least one server-suggested media playlist based, at least in part, upon whether at least one certain media data item associated, at least in part, with the at least one server-suggested media playlist is stored, at least in part, at the server system or at the cellular client electronic device, the at least one certain media data item being capable of being selected, at least in part, via the user interface, for playing by the cellular client electronic device.

31. The server system of claim 25, wherein:
the at least one media item comprises at least one purchased media item, the at least one purchased media item being purchased via the server system.

32. Non-transitory computer-readable storage storing instructions that when executed, at least in part, by at least one processor of a server system result in the server system being capable of performing operations, the server system being capable of communicating with a cellular client electronic device, when the cellular client electronic device is in operation, via at least one network, the at least one network comprising at least one Internet network, the operations comprising:

permitting access, at least in part, to at least one server-suggested media playlist by the cellular client electronic device, the at least one server-suggested media playlist being generated, at least in part, by the server system based, at least in part, upon user media preference data and user media history data, the user media preference data to be provided, at least in part, by a user of the cellular client electronic device, the at least one server-suggested media playlist being capable of being stored, at least in part, in the cellular client electronic device and/or in the server system, the at least one server-suggested media playlist being capable of comprising at least one listing that indicates, at least in part, media data items that are to be played in a sequence defined, at least in part, by the at least one media playlist, the media data items being capable of comprising at least one media data item and at least one other media data item, the at least one server-suggested media playlist being capable of being played, at least in part, at the cellular client electronic device based, at least in part, upon at least one media stream to be provided, at least in part, from the server system via the at least one network to the cellular client electronic device for use in playing of the at least one server-suggested media playlist;

wherein:

the at least one media stream is to be provided, at least in part, by the server system to the cellular client electronic device based, at least in part, upon whether the user of the cellular client electronic device is a subscriber of at least one subscription-based service associated, at least in part, with the server system, the server system being capable of providing at least one relatively reduced service, relative to the at least one subscription-based service, for a non-subscriber of the at least one subscription-based service;

the cellular client electronic device is capable, when the cellular client electronic device is in the operation, of downloading, at least in part, from the server system for storing, at least in part, in the cellular client electronic device, the at least one media data item and/or the at least one other media data item, the at least one media data item and the at least one other media data item when stored in the cellular client electronic device being usable by the user only so long as the user remains subscribed to the at least one subscription-based service;

the server system is capable of providing the at least one server-suggested media playlist to another client electronic device associated with the user;

the at least one server-suggested media playlist is capable of being modified, at least in part, based upon at least one user input to be provided via a user interface of the cellular client electronic device, to generate at least one modified media playlist; and the server system is also capable of synchronizing, at least in part, across the cellular client electronic device and the another client electronic device, the at least one modified media playlist.

33. The non-transitory computer-readable storage of claim 32, wherein:

the cellular client electronic device also is capable, when the cellular client electronic device is in the operation, of executing an operating system;

the operating system is based, at least in part, upon a Linux operating system; and the at least one media data item and the at least one other media data item comprise media tracks.

34. The non-transitory computer-readable storage of claim 32, wherein:

the at least one media data item is to be stored, at least in part, in the cellular client electronic device;

the at least one other media data item to be stored, at least in part, at the server system, the at least one other media data item being unavailable for retrieval, at least in part, from the storage for playing by the cellular client electronic device; and the at least one media stream is to correspond, at least in part, to the at least one other media data item.

35. The non-transitory computer-readable storage of claim 32, wherein:

the cellular client electronic device is capable, when the cellular client electronic device is in the operation, of beginning to play, at least in part, the at least one media stream prior to the at least one media stream being entirely received by the cellular client electronic device.

36. The non-transitory computer-readable storage of claim 32, wherein:

the cellular client electronic device is capable, when the cellular client electronic device is in the operation, of displaying, via the display, respective icons in association with respective media data items in the at least one media playlist;

the respective icons are to indicate whether the respective media data items are stored in the server system or in the cellular client electronic device.

37. The non-transitory computer-readable storage of claim 32, wherein:

the cellular client electronic device comprises a cellular telephone device;

the cellular client electronic device is capable of:

displaying, at least in part, via the display, at least one icon in association with the at least one other media data item and the at least one server-suggested media playlist, the at least one icon being to indicate that the at least one other media data item is stored, at least in part, at the server system instead of being stored, at least in part, in the cellular client electronic device; and receiving, at least in part, via the user interface, at least one further user input that requests, at least in part, change in manner of display, via the display, of the at least one server-suggested media playlist based, at least in part, upon whether at least one certain media data item associated, at least in part, with the at least one server-suggested media playlist is stored, at least in part, at the server system or at the cellular client electronic device, the at least one certain media data item being capable of being selected, at least in part, via the user interface, for playing by the cellular client electronic device.

38. The non-transitory computer-readable storage of claim 32, wherein:

the at least one media item comprises at least one purchased media item, the at least one purchased media item being purchased via the server system.

* * * * *